US011775401B1

(12) United States Patent
Kailasa et al.

(10) Patent No.: US 11,775,401 B1
(45) Date of Patent: Oct. 3, 2023

(54) INTELLIGENT COORDINATION OF LOG ANALYSIS AND REPAIR PROCESSES IN A MULTI-CLOUD SYSTEM

(71) Applicant: Bank of America Corporation, Charlotte, NC (US)

(72) Inventors: Venugopal Kailasa, Hyderabad (IN); Laxma Gavinolla, Hyderabad (IN); Durga Prasad Kutthumolu, Hyderabad (IN); Ramprasath S, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/726,658

(22) Filed: Apr. 22, 2022

(51) Int. Cl.
  *G06F 11/00* (2006.01)
  *G06F 11/20* (2006.01)

(52) U.S. Cl.
  CPC ...... *G06F 11/2025* (2013.01); *G06F 11/2094* (2013.01)

(58) Field of Classification Search
  CPC ............ G06F 11/0703; G06F 11/0706; G06F 11/0709; G06F 11/0715; G06F 11/0718; G06F 11/0724; G06F 11/0736; G06F 11/0766; G06F 11/0778; G06F 11/0784; G06F 11/0787; G06F 11/2025; G06F 11/2028; G06F 11/203; Y04S 40/00–20
  See application file for complete search history.

(56) References Cited

U.S. PATENT DOCUMENTS

| | | | |
|---|---|---|---|
| 9,430,256 B2 | 8/2016 | Raghu | |
| 10,613,962 B1 | 4/2020 | Delange | |
| 2015/0358196 A1* | 12/2015 | Baulier | G06F 11/2028 709/206 |
| 2017/0134092 A1 | 5/2017 | Foster et al. | |
| 2017/0251365 A1 | 8/2017 | Burchardt et al. | |
| 2020/0356433 A1* | 11/2020 | Kumar | G06F 11/0709 |
| 2020/0379868 A1 | 12/2020 | Dherange et al. | |
| 2021/0357282 A1 | 11/2021 | Verma et al. | |
| 2022/0158889 A1* | 5/2022 | Jha | H04L 41/0686 |

OTHER PUBLICATIONS

N. Goel and M. Agarwal, "Smart grid networks: Astate of the art review," 2015 International Conference on Signal Processing and Communication (ICSC), Noida, India, 2015, pp. 122-126 (Year: 2015).*

Abrahamsen, Fredrik Ege, Yun Ai, and Michael Cheffena. 2021. "Communication Technologies for Smart Grid: A Comprehensive Survey" Sensors 21, No. 23 (Year: 2021).*

* cited by examiner

*Primary Examiner* — Michael Maskulinski
(74) *Attorney, Agent, or Firm* — Banner & Witcoff, Ltd.

(57) ABSTRACT

Data server and client device logs may be transmitted over a network for analysis to identify potential issues such as errors. Because the logs may include significant amounts of data, the logs may be transmitted through a quantum smart grid network that leverages Li-Fi technology for increased bandwidth and improved latency. Analysis and resolution identification may be performed by an analysis server that is supported by multiple cloud systems. Each cloud system may be independent operated from other cloud systems, and may include one or more cloud servers configured to analyze log feeds and/or identify resolutions for detected issues. The analysis server may be configured to distribute tasks to the cloud systems based on a variety of factors, and further provide switchover and failover functionality between different cloud systems depending on communication or processing conditions.

20 Claims, 7 Drawing Sheets

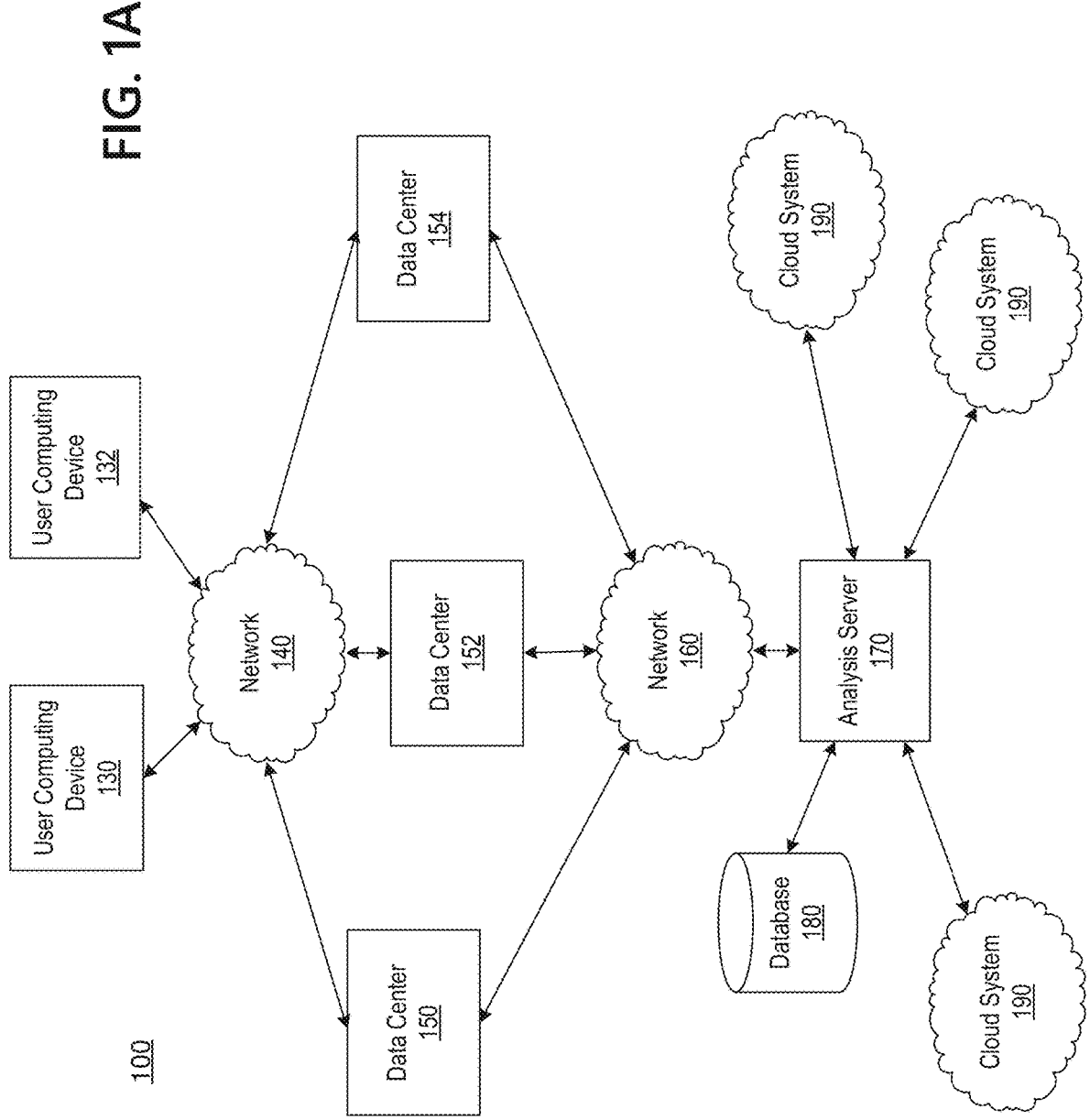

INTELLIGENT COORDINATION OF LOG ANALYSIS AND REPAIR PROCESSES IN A MULTI-CLOUD SYSTEM

BACKGROUND

Aspects of the disclosure relate to electrical computers, systems, and devices for interconnecting devices through a network, aggregating and transmitting data over the network, and providing automated resolution to errors and issues detected from the data.

Companies and other organizations often provide services internally and externally through the use of data and processing servers. For example, some companies employ multiple data centers throughout a city, state, country, province, or the world. Each of these data centers may comprise multiple data servers that are configured to process information and interactions from users. In some instances, these data centers are configured to generate real-time logs reporting a condition, status, and/or other attribute of the data center or server. Given the magnitude of some data centers and the volume of services provided by the data servers therein, these logs may be of significant size. Generally, these logs are analyzed locally at the data center to identify issues or events within the logs that might call for manual intervention or attention. The use of local resources to analyze these logs is generally attributable to the volume of log information and the time required to transfer that amount of data over a network for remote analysis. For example, existing networks might not have sufficient bandwidth or low enough latency to effectively facilitate the transmission of log data for remote analysis and processing.

Additionally, when an error or failure of a data server or data center occurs, existing recovery processes typically require or involve human intervention. In particular, individuals must be manually stationed at the data center to evaluate the real-time logs to determine the problem, and subsequently identify a resolution. This may take a significant amount of time, during which, the data center may be inoperable. Consequently, services typically provided by the data center might also be unavailable. In at least some industries, including banking and financial services, utilities, and emergency services, such downtime or unavailability may have severe implications.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

According to some aspects, a system and process for the real-time communication and processing of data center and client device logs and other information allows for timely review of log information to identify problems or potential issues, as well as for remote resolution of identified problems or issues. The system may include a Li-Fi network that is a high-bandwidth low-latency network for the transmission of large amounts of log data. In one example, servers in a data center may each transmit log information to a router or other communication node using Li-Fi technology. This information may be aggregated at the data center and transmitted on to a data analysis server or system located remotely from the data center for evaluation and possible resolution as needed.

In various aspects, the system and process may further include a smart grid network that provides both communication capabilities as well as power to devices connected to the network. In one example, a smart power grid may both provide power (e.g., DC power) as well as carry data packets to and from a data center. This may thus reduce the amount of infrastructure needed that would otherwise be needed to separately support data communications and the power supply. Additionally, the smart grid network may be intelligently controlled and modifiable in real-time. For example, a power supply may be increased or decreased (or turned off and on) to particular parts of the network or particular locations and devices depending on power consumption needs and network conditions.

According to other aspects, the smart grid network may be a quantum smart grid network. Quantum networking may include the use of quantum entanglement to convey data from one qubit to another at extremely fast speeds and with little-to-no latency. In some examples, quantum networks may use photon particles and entanglement thereof for transmission of data.

In some arrangements, the servers may be provided using efficient, Internet of Things (IoT) configured computing devices that are further interfaced with a Li-Fi network communication component. For example, these computing devices may be single-board computers.

In further arrangements, the data and error analysis system may interact with one or more cloud systems for processing the log data, identifying possible issues, and generating resolutions to those issues. For example, the data and error analysis system may interface with a cloud server to maximize processing efficiency. In some instances, the data and error analysis system may interface with multiple cloud systems that are independently operated by different providers. Such a configuration may allow for failover or distributed processing as necessary.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 1A and 1B depict illustrative network and computing environments for implementing log generation and transmission and repair processes in accordance with one or more aspects described herein.

DETAILED DESCRIPTION

Figure 1B:
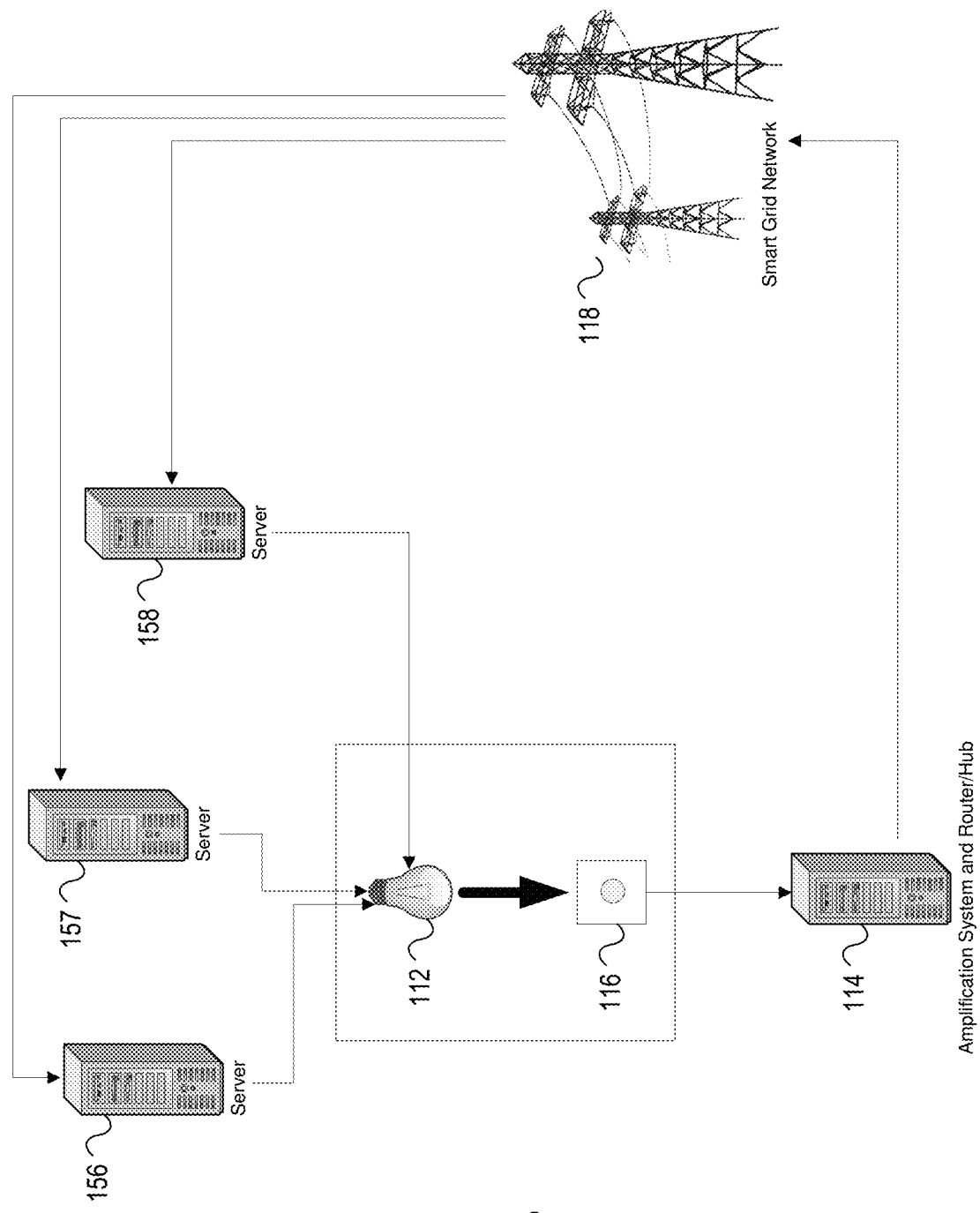

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Error identification and recovery in systems and organizations that use data centers can be performed remotely and in an automated fashion, without requiring manual intervention at the data center site to diagnose and/or correct potential issues. This may allow an organization or system to use a broader accumulated knowledge base of issues to identify possible errors and resolutions to those errors, as well as to provide a more consistent approach to addressing issues. Moreover, remote monitoring and error correction may alleviate the amount of processing power and resources required at each data center site. Given the number of data centers, and data servers, some organizations use, this reduction may amount to a significant savings in resources.

To provide a more centralized and consistent approach to data and error analysis, reporting information such as processing logs may be transmitted from each data center to a remote data and error analysis system for evaluation. Given the vast amounts of log information that may be generated at each data center, a network that has significant bandwidth is desirable to help facilitate that transmission. Additionally, in many instances, errors may be time-sensitive and require corrections as quickly as possible so as not to interrupt (or significantly interrupt) services. Accordingly, low latency may also be important to any transmission of data center logs to the remote data and error analysis system. A network that achieves both high bandwidth and low latency may include a quantum smart grid network that provides quantum-based communications using photonic entanglement. Other quantum networks or non-quantum networks may also be used depending on the needs of the system or organization.

Additionally, faster and more efficient transmission within each data center may also be advantageous. A data center may host hundreds or thousands of data servers, and each server may be configured to generate its own log stream or feed. In some configurations, the data center must be equipped to aggregate that log data for subsequent transmission to a data and error analysis system. In one example, each data center may include a Li-Fi network for transmissions between each data server in the data center and a communication aggregator or hub configured to route the aggregated logs to the remote data and error analysis system. In one example, the Li-Fi network may use visible light (e.g., LEDs) communications to maximize bandwidth while maintaining low latency.

Further, an analysis server configured to analyze log feeds and provide repair processes may use a multi-cloud server system. The multi-cloud server system may include multiple cloud server systems that are each independently operated. The analysis server may coordinate processing of log feeds based on a variety of factors including processing speed, available processing capacity, latency, bandwidth, location of servers and the like. This may allow for failover processing and optimized resolution processing for recovering services and devices in the network.

These and various other arrangements will be discussed more fully below.

FIG. 1A illustrates a computing environment 100 in which a data reporting and error analysis system may be implemented. Data reporting and error analysis system 100 may be used to support various services that may be provided through a network such as network 140 in computing environment 100. In one example, data centers 150, 152, and 154 may be associated with an organization providing banking services such as online access to bank accounts, processing payments, loan applications, tax services, accounting services and the like. In other examples, data centers 150, 152, and 154 may provide other types of services such as online activities, entertainment, graphics or photo editing services, word processing, shopping, and the like. According to some arrangements, each of the data centers 150, 152, and 154 may provide different types of services, and may be part of the same organization or may correspond to different organizations. Services may be provided by individual or multiple servers within each data center 150, 152, 154, as will be described in further detail below.

Users or clients may use the services offered by an organization by accessing the servers within data centers 150, 152, and 154 through client devices such as devices 130 and 132. Devices 130 and 132 may include various types of computing and communication devices including mobile devices (e.g., smartphones, tablets), personal computers (e.g., desktop computers, laptop computers), wearables (e.g., smartwatches, smart rings, etc.). Devices 130 and 132 may also include other types of electronic devices such as refrigerators, washing machines, dryers, lighting devices, stoves, ovens, microwaves, and the like, and other electronic devices such as vehicles. These devices may include processors and communication interfaces with which the devices 130 and 132 may process and execute instructions, and communicate with each other and/or other devices. For example, devices 130 and 132 may access the services provided by data centers 150, 152, 154 through network 140. Network 140 may include a public network or a private network, and may comprise sub-networks (e.g., Local Area Networks (LANs), Wide Area Networks (WANs), or the like). In one example, network 140 may include a private network between devices 130 and 132 such as a user-configured home network that interconnects devices (e.g., one or more of devices 130, 132 or other devices) that are situated in a user's home or other location. In some examples, a device such as user computing device 132 may connect to the network 140 through another device such as computing device 130. Additionally or alternatively, devices may communicate directly to one another using various communication technologies and protocols including Bluetooth, NFC, infrared and the like. In other examples, network 140 may include a wide area public network such as the Internet. In some aspects, communications between devices 130, 132 and data centers 150, 152, 154 may be encrypted or use other communication security protocols (e.g., virtual private networks, tunneling, etc.) to enhance privacy and security.

To maintain the continuous and efficient operation of the data centers and the offered services, computing environment 100 also may include a data and error analysis system. This system may include analysis server 170, database 180, and cloud systems 190. In one example, analysis server 170 may be configured to monitor and identify potential errors and issues experienced by any of the client devices 130, 132, and/or data centers 150, 152, 154. In some arrangements, each of the client devices 130, 132 and data centers 150, 152, 154 may generate and transmit real-time logs to the analysis server 170. The real-time logs may include a variety of information including processing load, currently executing tasks or functions, the name or other identifier of executables currently being run, code segments, screenshots, a number of clients being serviced, debug or error logs, power supply and consumption levels, how hot or cold an environment is, noise levels, air circulation levels, and the like. Using this log information, analysis server 170 may identify errors or issues that might exist, causes of those errors or issues, and determine and/or generate resolutions to correct the errors or issues. In one configuration, analysis server 170 may use a knowledge base and machine learning based on historical error or issue resolution data. The historical information and knowledge base may be stored in a database such as database 180. As issues are identified and resolutions are generated or determined, such correlations and records may be stored in database 180 as well.

According to some arrangements, the machine learning and analysis of feed logs and/or identification of a resolution may be performed, in whole or in part, by one or more cloud systems 190. For example, analysis server 170 may receive log feeds from devices 130, 132 and/or data centers 150, 152, 154 and subsequently delegate analysis of those feeds or resolution identification to one or more cloud systems 190. Each cloud system 190 may have computing resources separate and independent of the other cloud systems 190 and be operated by a different cloud provider. Examples of cloud systems include AMAZON WEB SERVICES, MICROSOFT AZURE, and GOOGLE CLOUD. According to some aspects, analysis server 170 may dynamically determine how log and error processing is distributed between the resources of analysis server 170 and the resources of one or more of cloud systems 190. For example, if processing of a particular log feed may be computationally intensive, analysis server 170 may elect to delegate the processing of that log feed to one or more of cloud systems 190. In another example, if a log feed includes highly confidential information, analysis server 170 may elect to process that log feed internally (e.g., by resources owned and/or operated by an organization corresponding to analysis server 170, or by resources within the organization's private network). In still another example, if a log feed includes processing-intensive and highly-confidential information, the feed log may allocate all non-highly-confidential portions of the log feed to one or more of cloud systems 190, while maintaining processing responsibility for all highly-confidential portions. Analysis server 170 may also delegate processing based on task or type of task. In some arrangements, analysis server 170 may process the logs to identify potential errors or issues, while delegating resolution formulation or determination to the cloud systems 190. According to other aspects, analysis server 170 may monitor the processing loads and/or other server attributes of each of analysis server 170 and cloud systems 190 to determine an optimal and efficient distribution of processing tasks.

Because the volume of the log feeds from one or more or all of client devices 130, 132 and data centers 150, 152, 154 may be significant, network 160 may use quantum network communications to convey data and information. Quantum network communication includes the transmission of messages using quantum states of particles. In one example, these particles may be photons and the network may include a fiber optic network that conveys information through the quantum state of these photon particles. Quantum entanglement may also be used so that changes to one particle will automatically be reflected in an entangled second particle. Communications through quantum networks may be much faster than existing network communication protocols. Additionally, network 160 may include a smart electrical grid. This allows network 160 to not only provide communication capabilities, but also to provide power for the devices interconnected thereby. Accordingly, data centers 150, 152, 154, for instance, may receive both network communications as well as power through the same network 160.

As discussed, cloud systems 190 may include multiple independently operated server clouds. In some arrangements, analysis server 170 may use or otherwise interface with these server clouds to provide additional capacity as well as to add possible redundancy in the event one of the cloud systems 190 experiences a failure or is otherwise compromised (e.g., operating at a reduced capacity, suffering from a malware attack, etc.). In one arrangement, analysis server 170 may monitor the operating statuses of each of cloud systems 190 and select one or more of cloud systems 190 to handle various tasks and operations. Operating status information may include processing load, available processing capacity (e.g., parallel processing capabilities and/or capacity, number of servers available, amount of processing power available, etc.), server locations, storage capacity, network latency (e.g., for communications between server 170 and cloud systems 190), the level of heat or cold (e.g., ambient, CPU, etc.), and the like. In one example, analysis server 170 may transition a processing task (e.g., formulating a solution for a detected error) from a first cloud system to a second cloud system upon detecting that the network latency between the server 170 and the first cloud system is higher than a specified latency threshold and/or higher than a latency between server 170 and the second cloud system. In another example, server 170 may compare locations of cloud servers in each of a first cloud system and a second cloud system relative to the location of server 170. Server 170 may then prioritize geographically closer cloud servers over more distant ones. In yet another example, server 170 may compare processing speeds among each of the cloud systems 190 and prioritize cloud systems with higher processing speeds.

While the illustration of FIG. 1A includes particular numbers of devices, any number of systems or devices may be used without departing from the aspects described herein.

FIG. 1B illustrates an example system architecture for a data center, such as data center 150 of FIG. 1A. The same or substantially similar system architecture may also be used to implement any number of data centers, including data centers 152 and 154. Referring to FIG. 1B, a data center may include multiple servers 156, 157, 158 that are each configured with a light transmitter 112. For example, light transmitter 112 may include a transmitter circuit and a light element such as a light emitting diode (LED). To transmit data through the transmitter circuit and LED, each data server 156, 157, 158 may encode the data into bits (e.g., 1's and 0's), which are then conveyed by rapidly turning on and off the LED. In some arrangements, the LED is an array of LEDs which may be individually controlled to increase the bandwidth of transmission. On the receiving side, the data center may include a photodetector 116, a filter, and one or more amplification systems to amplify the resulting signal. Photodetector 116 may be configured to detect the output of the LEDs, while the filter may be used to remove noise from the sensed signals. The amplification system, e.g., amplification system 114, may amplify the filtered signal. Once amplified, the filtered signal may then be transmitted over a network 118, which may be a quantum optics smart grid network (e.g., network 160 of FIG. 1A). Amplification system 114 may include multiple amplification devices that may each be responsible for a different channel in the Li-Fi network. Alternatively, amplification system may include a single amplification device that is configured to amplify signals for all channels and signals transmitted through the Li-Fi network.

According to some aspects, each of data servers 156, 157, 158 may communicate over the Li-Fi network through a different channel. A channel may be defined based on time slots, wavelength of light, and the like. For example, data server 156 may transmit information using red light, while data server 157 may transmit information using blue light. In other examples, data server 157 may transmit information in a first time slot, while data server 158 may transmit information during a second time slot distinct from the first time slot. Such an arrangement may allow a single photodetector 116 (or multiple photodetectors) to detect light output by multiple transmitters for multiple data servers concurrently. This may substantially increase the amount of data transmission bandwidth available in the network.

Amplifier system 114 may also include or otherwise serve as a network router or hub that interfaces with an external network. Accordingly, once data is received and processed by amplifier system 114, the data may be transmitted onward to an external destination. In one example, the external network may be a smart grid network such as network 118 which transmits information over an electrical grid that provides both power and communication capabilities. Network 118 may further use quantum networking to transmit information based on the quantum states of particles as discussed with respect to FIG. 1A. This allows a large volume of information (e.g., log feeds generated by servers 156, 157, 158) to be sent quickly not only within the data center, but also externally to one or more remote recipient systems.

Although not illustrated, the data center may also be configured to transmit information to each of servers 156, 157, 158 through the Li-Fi network. Accordingly, each server 156, 157, 158 may also include a photodetector and amplification system for receiving information from one another or from other devices both internal and external to the data center. For example, data incoming from an error correction system (e.g., analysis server 170 of FIG. 1A) or from client devices (e.g., devices 130, 132 of FIG. 1A) may be transmitted from a router or hub to each server 156, 157, 158 through the Li-Fi network. Accordingly, data may be sent with high bandwidth and low latency both to and from the data servers.

Each of servers 156, 157, 158 may include one or more low-cost, efficient (e.g., single-board) computing devices such as RASPBERRY PI or ARDUINO devices. Each device may be configured to provide one or more services to client devices. For example, a RASPBERRY PI server may be configured to process banking requests and tasks, while an ARDUINO device may be configured to host entertainment services. Such computing devices may also be pre-configured for remote access and operation. Accordingly, servers 156, 157, 158 may be configured to receive and execute instructions from remote systems and users, such as from one or more client devices (e.g., devices 130, 132 of FIG. 1A). These instructions may include tasks such as rebooting, executing a script, modifying code, turning on or off a software or hardware module, performing diagnostics, setting permissions, and the like.

Figure 2:
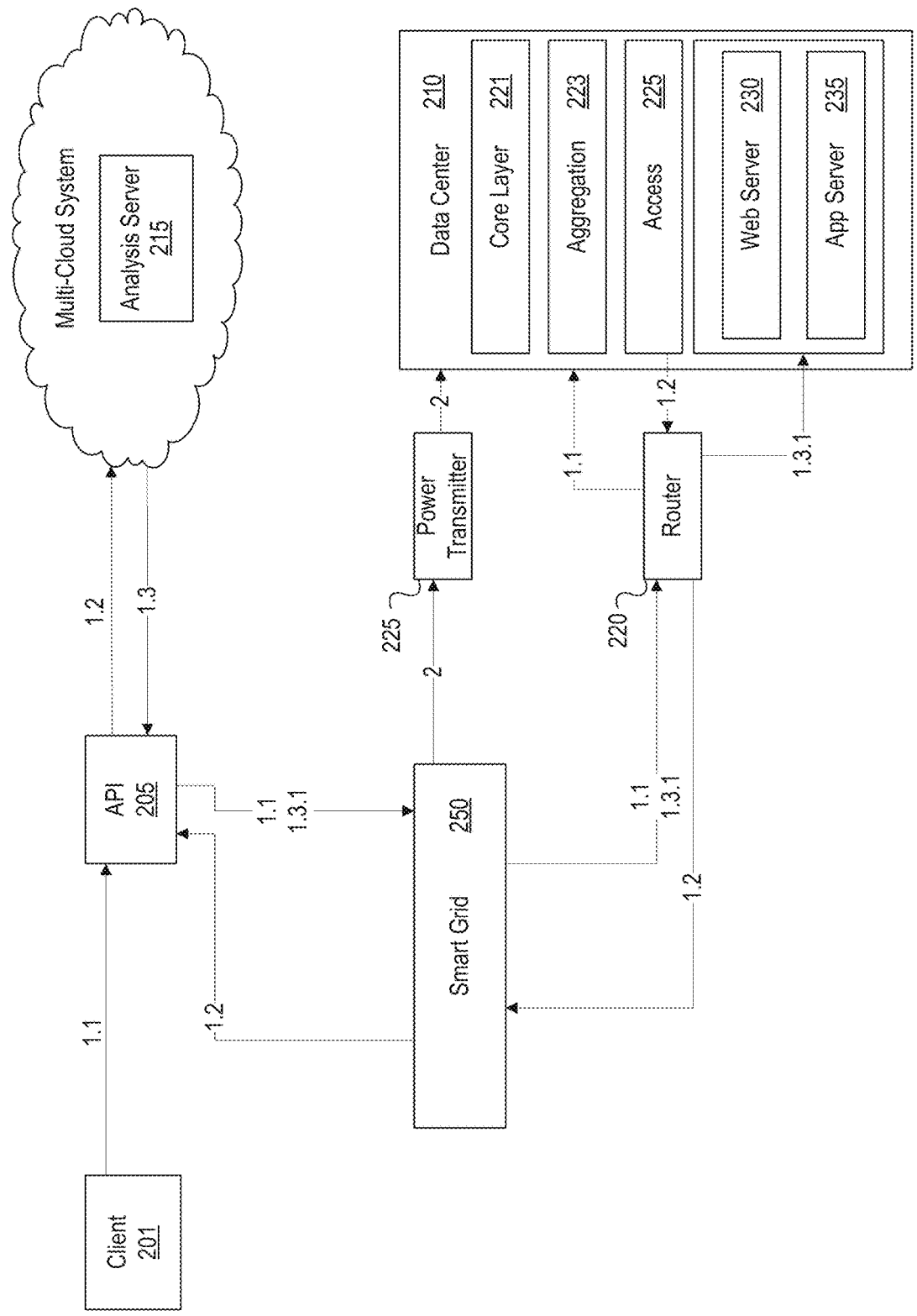
FIG. 2 illustrates an example system and data flow for log transmission and repair processes according to one or more aspects described herein.

FIG. 2 is an illustrative analysis and resolution system with data flows showing example log reporting, analysis, and resolution processes according to one or more aspects described herein. Client device 201 may correspond to a client computing device associated with an end-user, an operator, an organization user or the like. In one example, client device 201 is an end-user's home computer. In another example, client device 201 is a computer corresponding to an administrator of the analysis and resolution system. In yet another example, client device 201 is an employee computer operating at a business site of the organization associated with the analysis and resolution system.

Client device 201 may generate log feeds that report various types of information to a data center or analysis server as shown in process 1.1. These log feeds may include periodic reports of scripts or other computer code being executed, error indicators generated by various processes, user reports identifying a problem, system information showing one or more system attributes at various points in time (e.g., when a crash occurs), and the like. This information may be packetized or otherwise packaged and transmitted over a network through an application programming interface (API) 205 to a data center (e.g., data center 210) associated with the client device 201. In one example, each client device may be assigned to a data center for accessing services. These assignments may be fixed or dynamic. For example, a data center may direct a client device (e.g., client device 201) to a different data center to help balance load or to improve communication speed (e.g., latency). In another example, a client may be reassigned to another data center if the client seeks services unavailable at the initially assigned data center. Alternatively or additionally, client device 201 may be configured to select the data center. For example, a user of client device 201 may manually select a data center.

Client device 201 may access API 205 and data center 210 through various types of networks including a public wide area network such as the Internet, a private network, and the like. In some examples, client device 201 may use secure communication protocols such as virtual private networks (VPNs) and/or other types of encryption to transmit information through API 205 and to data center 210 or other devices in the system. Client device 201 may dynamically control what protocols and security encryption is used (or if encryption is used at all) depending on the type of information being sent. Accordingly, personal information may be encrypted while routine status information (e.g., operational vs. non-operational) might not be. Selective encryption may help enhance the efficient use of computing and communications resources in client device 201 and/or in the system as a whole.

API 205 may publish or otherwise provide a variety of function calls that allow client device 201 to effectively and efficiently communicate and interact with one or more of the devices in the system, including data center 210 and analysis server 215. API 205 may provide a common set of function calls for similar functions or services provided throughout the system by different devices (e.g., by different data centers). For example, API 205 may include a reporting function called by client device 201 to transmit log feeds to data center 210 and/or analysis server 215. The reporting function may provide a particular data format specification and/or communication protocol (e.g., specific security protocols, packet formats, particular network to use) for sending the log feeds to data center 210. API 205 may also include functions that allow client device 201 to access services hosted by data center 210 and/or analysis server 215. In still other examples, API 205 may publish functions for user registration, device registration, monitoring a status of the data center, testing a connection between client device 201 and data center 210 and/or analysis server 215, performing diagnostics and the like.

Transmission of log feeds from client device 201 may be provided over a smart grid network 250. Smart grid network 250 may be a quantum optics smart grid network (e.g., as described with respect to network 118 of FIG. 1B and network 160 of FIG. 1A). Smart grid network 250 may provide both power (e.g., electrical power), as shown in process 2, and communication (processes 1.1, 1.3.1) to data center 205. Accordingly, messages such as log feeds from client device 201 may be transmitted over a communication portion of the smart grid network 250 (process 1.1) using a router 220, while power may be provided (process 2) through a power transmitter 225. For example, the smart grid network 250 may include an electric circuit for transmitting power along with a supporting fiber optic network for quantum optics-based data communications. In particular, the fiber optic portion of smart grid network 250 may be configured to transmit photons and use their quantum states to carry information (e.g., one or more bit values). In some examples, network 250 may include quantum repeaters to provide amplification to these quantum-based transmissions. These repeaters may use entanglement to replicate the state of one photon to another to thereby amplify or enhance the signal over longer transmission distances. In another example, the smart grid network 250 may carry packetized information using energy packets through the electrical distribution lines.

Upon receiving log feeds or other information through the smart grid network 250, data center 210 may decode or otherwise process the transmission. For example, data center 210 may include an access layer 225 which may be configured to process both incoming and outgoing quantum optics-based messages (e.g., converting binary information into or from a quantum state of photons). Upon receipt of the log feeds from client device 201, data center 210 may aggregate these log feeds with its own. For example, client device 201 may include multiple servers such as web server 230 and app server 235 that each generate log feeds. As discussed with respect to FIG. 1B, these log feeds may be transmitted internally within data center 210 using a Li-Fi network. In one or more examples, the aggregation layer 223 may include Li-Fi network optical switches configured to allow servers 230 and 235 to transmit information at different frequencies, thereby increasing the bandwidth and efficiency of aggregating log feeds from multiple servers within data center 210. Additionally, data center 210 may include core layer 221 configured to and responsible for high-speed packet switching for data flows coming into and out of the data server (e.g., to and from the data servers). Core layer 221 may be configured to manage and instruct the aggregation layer 223 to coordinate the transmission of log feeds from aggregation layer 223. In some examples, a data center may include multiple aggregation layers or modules and core layer 221 may coordinate operation of the aggregation layers or modules. Core layer 221 may also house management functions configured to instruct and coordinate functionality between all devices in data center 210.

Once aggregated, the log feeds (from servers 230, 235 and/or from client device 201) may be transmitted through quantum optics smart grid network 250 using router 220, as illustrated by process 1.2. This information is routed through smart grid network 250 to analysis server 215. Analysis server 215 is configured to receive the log feeds and analyze the information contained therein to identify problems, errors or other issues. Analysis server 215 may include multiple components, including a data server fixing component and a solution generator component. The data server fixing component may be configured to identify, generate, or otherwise determine a fix or resolution that may be applied to the data server. The fix or resolution determined by the data server fixing component may be an executable command, code, or other instructions that can be applied to the data server. In one example, the resolution may be an auto script (e.g., .sh or .bat executable) that may be applied in data center 210 to one or more of the servers experiencing the corresponding issue. The solution generator component, on the other hand, may generate instructions or solutions that are guided, rather than self-executing. For example, the solution generator component may identify and/or automatically generate a set of instructions to guide an individual to correct an issue within the data center or data server. In some cases, the fix or resolution may include both self-executing code as well as guided instructions.

The resolutions (e.g., guided solution and/or self-executing fix) may be transmitted to data center 210 back through the smart grid network 250 (as shown by processes 1.3 and 1.3.1). Once received, one or more devices in data center 210 may apply the resolution to correct the error. For example, app server 235 or web server 230 may be configured to execute a script to correct an error. In some arrangements, the resolution may be sent to a device of an operator or agent to notify them of the issue and the fix (e.g., the guided instructions for correcting the error or problem). In other examples, a resolution to an issue (e.g., a power outage at data center 210) might not be transmitted back to data center 210. Instead, the resolution may sent to client devices or other data centers be to divert or re-route client interactions to one or more of the other data centers. Additionally or alternatively, analysis server 215 may direct the smart grid network 250 to re-route power so as not to waste electrical output to data center 210 when it is non-operational. Conversely, if data center 210 is experiencing a power outage, analysis server 215 may re-route power from another power source through smart grid 250 to data center 210. A variety of resolutions and processes may be identified and executed by analysis server 215 and/or data center 210.

Figure 3:
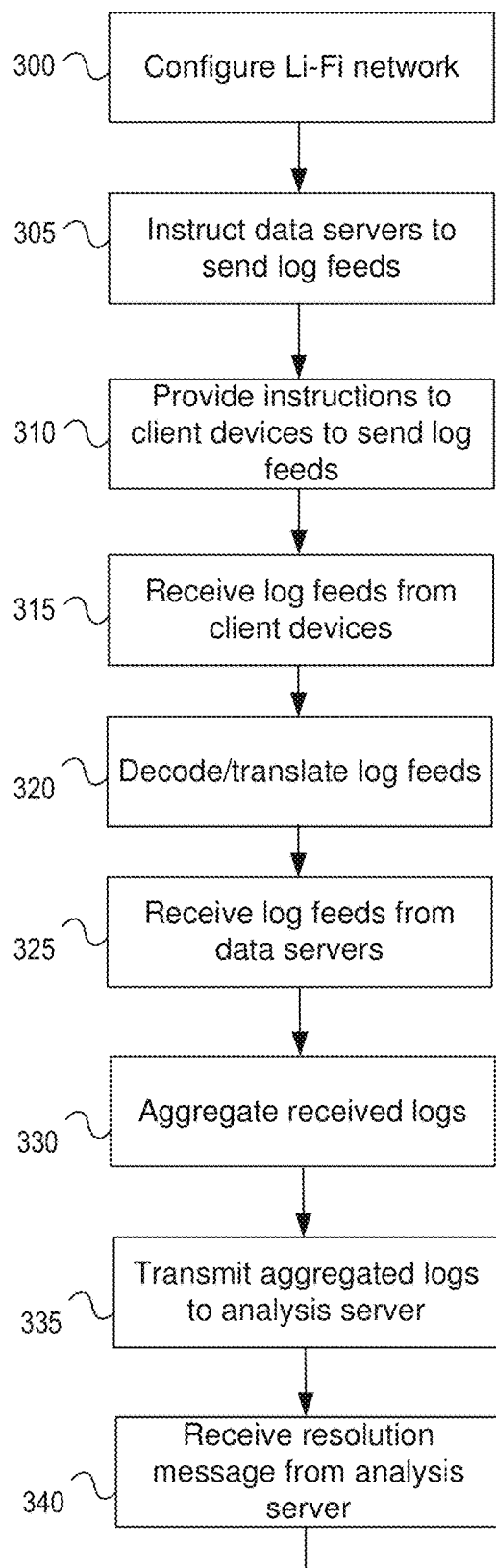
FIG. 3 is a flowchart illustrating an example process for aggregating log feeds for network devices according to one or more aspects described herein.
Figure 3:
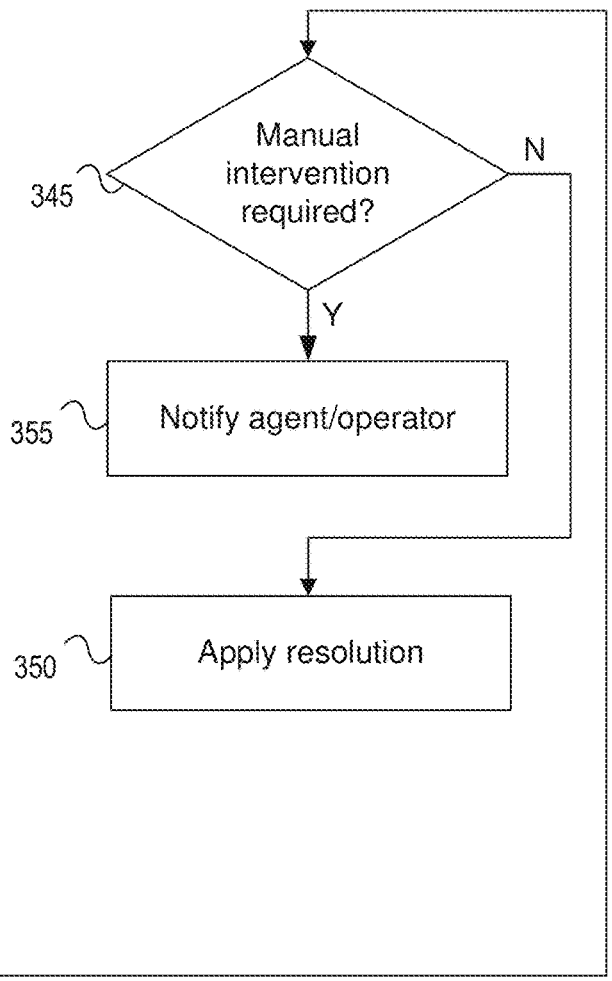

FIG. 3 illustrates an example process by which a data center (e.g., data center 150, 152, 154 of FIG. 1A and/or data center 210 of FIG. 2) may aggregate server and client information, including log feeds, and perform issue resolution based on the aggregated information. In step 300, for example, a data center may configure a Li-Fi network for communication between one or more data servers in the data center and an accumulator node or module (e.g., aggregation layer 223 of FIG. 2). A Li-Fi network may use photons to transmit information, which allows for faster and larger data transmissions. In a particular example, the Li-Fi network may be a visible light network (VLN) using LEDs to transmit information. Configuring the Li-Fi network may include designating a different channel (e.g., frequency, wavelength, etc.) for each of the data servers in the data center. In step 305, the data center may instruct each of the data servers to transmit log feeds to an accumulator node through the configured Li-Fi network. This instruction may include identifying the designated channel for each of the data servers. The instruction may also include parameters for log reporting such as a required frequency of reporting, a schedule for reporting, a trigger for sending log feeds, an amount and/or type of feed information to report, and the like and/or combinations thereof. In one example, the data center may instruct a data server to report log feeds when an error is detected, when a processing load exceeds a certain threshold, when processing speed slow down below a certain threshold, or when the environmental conditions rises above or falls below certain heat or cold levels. Additionally, or alternatively, the data center may instruct the data server to provide log feed information every 500 ms or every 5 seconds or the like depending on the situation. Further, the data center may indicate the type of information to be reported, such as the names of processes being executed, power consumption levels, heat or cold levels, and the like.

In step 310, the data center may further provide instructions to one or more client devices to also report log feeds. These instructions may be similar to those issued to the data servers, including specifying the type of information to be included and frequency of log feed reporting. In step 315, the data center may receive log feeds from the one or more client devices through a network in response to the instructions provided to those devices. In one example, this network may be quantum optic smart grid network configured to deliver both power and communications as described herein. In step 320, the data center may decode or otherwise translate the log feed information received through the network from the client devices. For example, the data center may convert quantized information transmitted through the quantum optic smart grid network into binary data. This may include determining a state of individual photons transmitted through the smart grid and interpreting the state of the photons into a binary state (i.e., 1 or 0). In step 325, the data center may receive log feeds from one or more data servers through the Li-Fi network. Upon receipt, the data center may further filter the signal to remove noise and amplify the resultant filtered signal using an amplifier circuit to enhance the integrity of the data signal.

In step 330, the data center, through the aggregator node, may aggregate the log feeds received from the data servers and the client devices. Each log feed of each of the devices may be packetized and an identifier may be added to the header to differentiate between the log feeds of each device. Once packetized, the log feeds may be transmitted over the quantum smart grid network in step 335 to the analysis server. In one example, the transmission of the log feeds may include the data center quantizing the data packets into photon particles (e.g., using the quantum properties of photons to encode information) and transmitting the photon particles over the quantum network. In some arrangements, the transmission over the smart grid network may further include entangling two particles to build redundancy and carry information more quickly. For example, quantum repeaters may be implemented along the network path that are configured to use entanglement swapping, thereby allowing for communication over longer distances.

In step 340, the data center may receive a resolution message from the analysis server. The resolution message may indicate a detected issue (e.g., an error, corrupted data, anticipated failure, etc.) and a resolution. As with other information transmitted through the quantum optic smart grid network, the resolution message may need to be decoded. For example, information carried by photon particles may be translated into binary information. This may be performed by an access node (e.g., access layer 225 of FIG. 2) in the data center. In step 345, the data center may determine whether manual intervention is required as part of the resolution provided by the analysis server. For example, if the resolution is a set of instructions guiding an agent or operator on repairs, the data center may determine that manual intervention is necessary. On the other hand, if the data center determines that the resolution message includes executable code, the data center may determine that manual processes are not needed. Accordingly, if manual intervention is not needed, the data center may execute the resolution provided by the analysis server in step 350. As discussed herein, this may include executing a code or script provided by the analysis server. If, however, the data center determines that manual steps are involved in resolving the issue, the data center may notify one or more agents or operators in step 355. This may include sending a message to an agent or operator's device such as a smartphone or smartwatch or other personal computing device.

In some arrangements, the data center may determine that a resolution message includes a fix for a client device. Accordingly, the data center may route the resolution message to the client device upon determining that the resolution includes client device processes. Additional or alternatively, the data center may transmit confirmation messages to the analysis server upon the provided solution being applied.

Figure 4:
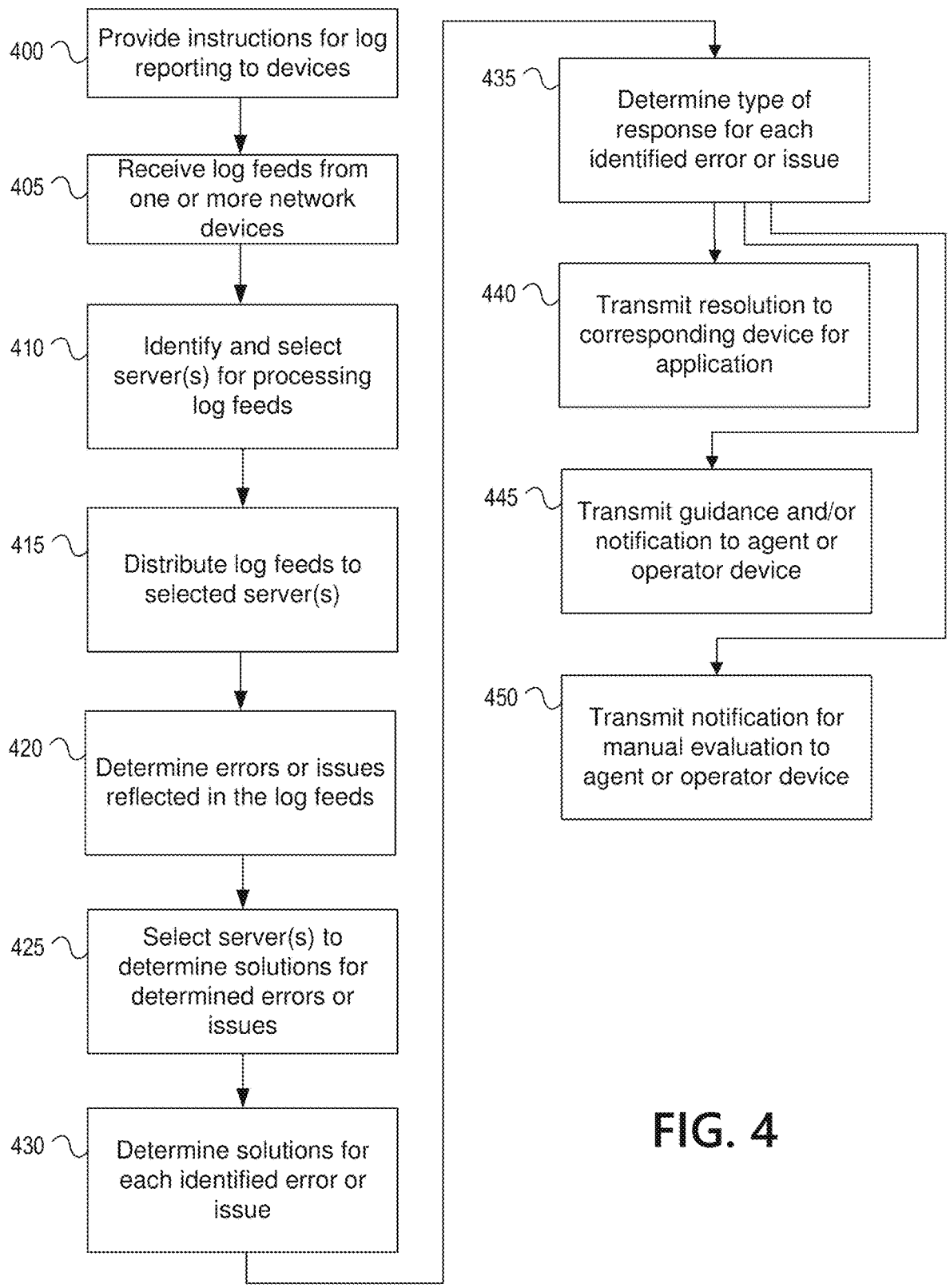
FIG. 4 is a flowchart illustrating an example process for analyzing log feeds and generating resolutions for identified issues according to one or more aspects described herein.

FIG. 4 illustrates an example process by which a multi-cloud analysis system may detect errors and provide resolutions according to aspects described herein. In step 400, an analysis server of the multi-cloud analysis system may provide instructions and parameters for log reporting to one or more devices in the communication network. For example, the analysis server may dictate or otherwise indicate a frequency, timing, and substance of log information to be provided to the analysis server. These instructions and parameters may be transmitted to the devices in the system, including data centers, data servers, client devices, user devices and the like. In one or more arrangements, the multi-cloud analysis system may change these instructions or parameters over time, depending on various factors including processing load, bandwidth, latency, heat or cold levels, and the like. For example, if the multi-cloud analysis system has a processing load above a certain threshold, the multi-cloud analysis system may decrease a reporting frequency for one or more devices in the system. In another example, if the multi-cloud analysis system determines that bandwidth has decreased, the system may instruct devices it is managing to decrease the frequency or amount of data that is reported as part of the log feeds. In yet another example, if the multi-cloud analysis system detects a storage capacity availability above a certain threshold or processing capacity above a threshold, the multi-cloud analysis system may request increased reporting frequency or increased additional information to be reported.

In step 405, the analysis server may receive log feeds from the one or more devices under its management such as client devices and data servers. These log feeds may include a variety of information including processes being executed, users interacting with the system, code segments being executed, processing loads, processing speeds, available bandwidth, storage capacity, power supply requirements, power supply levels, available functionality and the like. In step 410, the analysis server may identify and select one or more servers for processing the log feeds to identify possible issues, errors, or problems. The server may make this identification by evaluating the processing loads, communication bandwidth and/or latency, geographic location (e.g., proximity) of the servers, and the like and/or combinations thereof. This identification and selection may include considering servers provided in one or more cloud server systems, servers operated by the organization associated by the analysis server, as well as the analysis server itself. In one example, the analysis server may assign log feeds to various servers in order to maximize processing speed. In another example, the analysis server may assign log feeds based on bandwidth or latency between the server and other processing devices such as those in one or more cloud systems.

In step 415, the analysis server may distribute (e.g., transmit) the feed logs to the one or more selected servers or processing devices for analysis. In one example, the analysis server may transmit the log feed through a quantum network to maximize bandwidth availability given the volume of data the log feeds may include. Additionally, or alternatively, the analysis server may use encryption and/or secure communication protocols to convey these log feeds. For example, encryption or secure communication may be used to protect the potentially sensitive nature of the information contained in the log feeds. In step 420, the analysis server may determine one or more errors or issues reflected in the log feeds. This determination may include analysis by the server itself, or receiving a result of analyses performed by other selected processing devices. For example, the analysis server may identify error flags or codes that are embedded in the log feeds. In another example, then analysis server may look for data attributes, code segments, and other log information that match known data attributes, code segments or other log information that reflect an error or issue that is to be fixed or otherwise addressed. These known pieces of log information may be stored in a knowledge base that includes a collection of issues detected in historical logs.

In step 425, the analysis server may then select one or more servers or processing devices to determine solutions for the identified issues. This selection may be performed in similar fashion as described in step 410. In one example, this selection may consider whether the candidate servers or processing devices has a resolution generation capability or functionality, in addition to one or more device characteristics as discussed previously. In step 430, the analysis server may determine solutions or fixes for each of the identified issues. This determination may include processing by the analysis server or receiving suggested fixes from other devices and servers such as those in cloud server systems. In one or more examples, the analysis server may determine possible solutions to issues based on a knowledge base of historical issues and solutions applied to correct or otherwise address those prior issues. The analysis server may thus identify possible solutions based on a correlation between the same or substantially similar previously detected issues and previously applied solutions. In some configurations, the analysis server may use machine learning algorithms using the knowledge base of historical issue resolution data as training information. For example, such algorithms may include those developed by DeepMind and OpenAI. These solutions may include code or scripts that may be executed by a device such as a data server or client device, or may include guidance or instructions for an agent or operator to manually perform.

In step 435, the analysis server may determine a type of response for each identified issue. For example, the analysis server may determine that one issue or error may be corrected by an executable script or code, while another issue or error may require manually correction or to be addressed by an agent or operator based on generated guidance or instructions. In another example, the analysis server may determine that no solutions are available at this time. Upon determining the type of response, the analysis server may, in steps 440-450, take various steps to address the corresponding issue. For example, when the issue may be corrected by the corresponding device without manual intervention, the server may transmit the resolution in step 440 to that device for execution. If, on the other hand, the issue is to be corrected manually by an agent or operator with generated guidance, the server may transmit the guidance and/or notification to an agent or operator device in step 445. Additionally, or alternatively, the guidance or instructions may be transmitted to the affected device. In some examples, a notification may be sent to the agent or operator device, while the resolution (e.g., instructions or guidance) may be sent to the affected device.

Further, if no resolution is identified, the analysis server may send a notification requiring an agent or operator to further review the issue in step 450. This may include sending the log feed or portions thereof along with a notification to the agent or operator. The agent or operator may then develop a solution and apply the fix to the affected device or devices. In some examples, the analysis server may request confirmation that the issue has been corrected from the agent or operator in such instances.

In some arrangements, a resolution may include diverting services and processes from one data center, server or other device to another data center, server or other device. For example, if a data center is inoperable, a resolution may be to divert client devices using that data center for various services to another data center that offers the same services. In another example, the analysis server may also control the network to re-route power from a different source if a data center is suffering a power outage or decreased power supply from its original source. This may be achieved by using a smart grid network where the analysis server may direct power from various sources to selected destination devices. These steps (e.g., transferring services or re-routing power) may be performed in addition to or instead of the resolutions discussed above with respect to FIG. 4.

Figure 5:
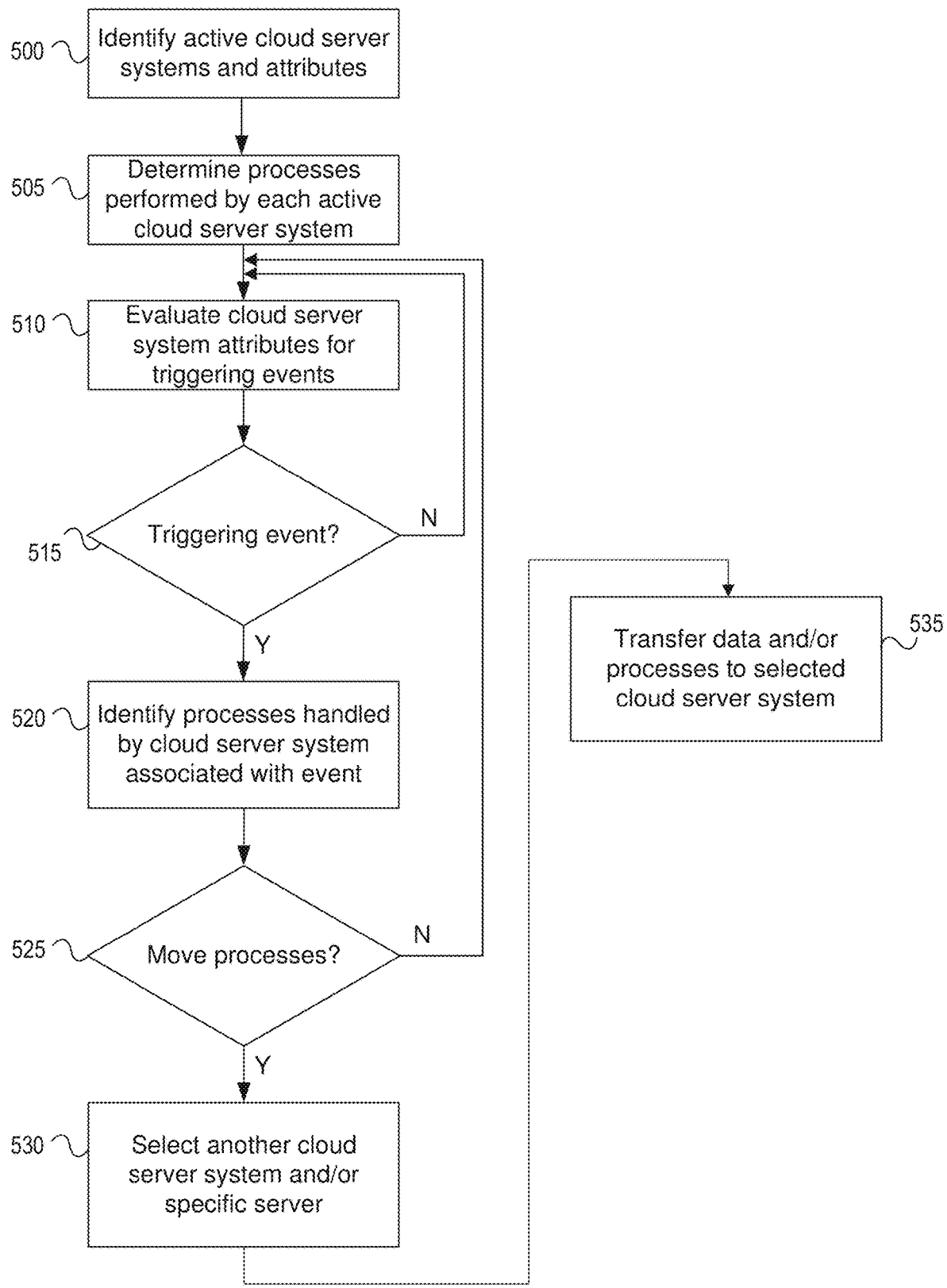
FIG. 5 is a flowchart illustrating an example process for transferring log analysis and error resolution processes in a multi-cloud server system according to one or more aspects described herein.

FIG. 5 illustrates an example process whereby a multi-cloud system may provide switchover or failover services. For example, if one cloud server system exhibits decreased performance or an error, another cloud server system may be used as a failover or backup to continue processing log feeds and error resolution. In step 500, an analysis server may identify all active cloud server systems to which it is interfaced. This may include sending a request message to each of the various registered cloud server systems to obtain cloud server system attributes. If a cloud server system does not respond within a certain amount of time, the analysis server might not identify that cloud server system as an active cloud server system. In some arrangements, the analysis server may continue to send request messages to the cloud server systems that did not respond to see if those server systems become active. The cloud server system attributes may include a variety of characteristics including number of available servers, location of the servers, processing load of the servers, processing speed, historical usage (e.g., versus time), and the like.

In step 505, the analysis server may determine processes performed by each of the active cloud server systems for the analysis server or an organization associated with the analysis server. For example, the analysis server may maintain a database that stores records of processes being performed (or previously performed) and the processing device responsible for those processes. In step 510, the analysis server may evaluate the cloud server system attributes received in step 500 to determine if any triggering events have occurred. Triggering events may be defined for instances where the analysis server should re-distribute processes assigned to one or more cloud server systems. An example trigger event may include a latency of a network connecting a cloud server system and the analysis server increases above a certain threshold. Another example trigger event may include a processing load of the cloud server system increasing above a threshold. In yet another example, a trigger event may include detecting failure of one or more servers in a cloud server system.

If a triggering event has occurred (as determined in step 515), the analysis server may identify processes currently being handled by a cloud server system associated with the triggering event in step 520. In step 525, the analysis server may determine whether the identified processes need to be moved to another cloud server system or whether the identified processes can wait for the existing cloud server system handling those processes to return to a more preferred operating state. For example, a more preferred operating state may be a state that does not qualify as a triggering event. The analysis server may determine whether to move or not move a process based on a variety of factors, including a criticality of functions and services provided by the affected devices (e.g., the data centers or data server or client devices). Another deciding factor may be a time of day. For example, if a log feed is being processed between midnight and 5 AM local time (relative to the data centers or client devices associated with that log feed), the analysis server may decide that the process need not be moved, and can wait for the existing handling cloud server system returns to a normal or preferred operating state.

If the analysis server determines that a process is to be moved from one cloud server system to another, the analysis server may select another cloud server system (and/or a specific server thereof) for transferring the process and task in step 530. In one example, the analysis server may determine a processing load of each of the other cloud server systems. Additionally, or alternatively, the analysis server may determine a geographic location of one or more servers of the other cloud server systems and/or a latency for network communications with those servers. This may indicate how quickly information can be transmitted and how quickly a response could be obtained. In further examples, the analysis server may use historical processing load information for each of the cloud server systems to predict or otherwise determine expected loads and to select a cloud server system that would be able to process the task quickest. In still other examples, the analysis server may consider a cost of using one or more of the cloud server systems and base, at least in part, it's selection of another cloud server system using this cost information.

Once another cloud server system (or a particular server of the other cloud server system) has been selected, the analysis server may transfer the corresponding data (e.g., log feeds, any results from the current cloud server system) in step 535. In one example, prior to transferring the processing from one cloud server system to another, the analysis server may request a current status report along with relevant results and data from the existing cloud server system. The analysis server may then determine whether the data and information needs to be reformatted from the destination cloud server system. Whether reformatting is required may also be part of the selection process of step 530, where a cloud server system requiring data reformatting may be ranked lower than a cloud server system that does not.

If data reformatting is not required, the analysis server may send the data and information to the new cloud server system and request processing. In one or more examples, a copy of the log feeds may be stored in a database separate from the cloud server systems. Accordingly, the log feeds may be transferred from the analysis server's existing data stores, rather than requiring transmission from the current cloud server system to the analysis server and subsequently to the new cloud server system. In other examples, the analysis server may request that a source cloud server system transfer information and data directly to a destination cloud server system. Some arrangements may further include communication between the analysis server and the cloud systems through a quantum optics network.

Figure 6:
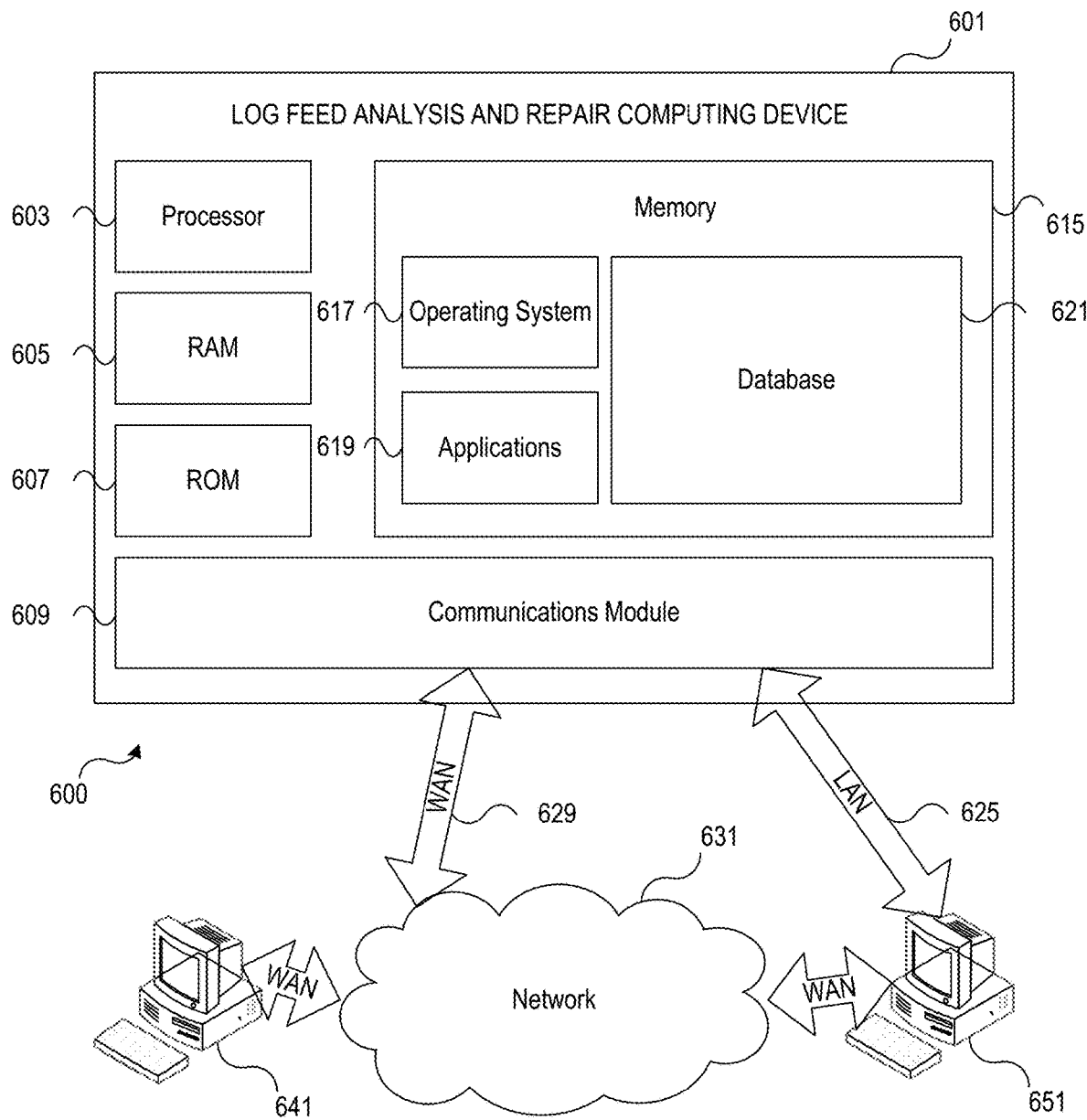
FIG. 6 illustrates an example operating environment in which one or more aspects described herein may be implemented.

FIG. 6 depicts an illustrative operating environment in which various aspects of the present disclosure may be implemented in accordance with one or more example embodiments. The arrangements described with respect to FIG. 6 may be applied any devices shown and described herein. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include log feed analysis and repair computing device 601 having processor 603 for controlling overall operation of log feed analysis and repair computing device 601 and its associated components, including Random Access Memory (RAM) 605, Read-Only Memory (ROM) 607, communications module 609, and memory 615. Log feed analysis and repair computing device 601 may include a variety of computer readable media. Computer readable media may be any available media that may be accessed by log feed analysis and repair computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by log feed analysis and repair computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on log feed analysis and repair computing device 601. Such a processor may execute computer-executable instructions stored on a computer-readable medium.

Software may be stored within memory 615 and/or storage to provide instructions to processor 603 for enabling log feed analysis and repair computing device 601 to perform various functions as discussed herein. For example, memory 615 may store software used by log feed analysis and repair computing device 601, such as operating system 617, application programs 619, and associated database 621. Also, some or all of the computer executable instructions for log feed analysis and repair computing device 601 may be embodied in hardware or firmware. Although not shown, RAM 605 may include one or more applications representing the application data stored in RAM 605 while log feed analysis and repair computing device 601 is on and corresponding software applications (e.g., software tasks) are running on log feed analysis and repair computing device 601.

Communications module 609 may include a microphone, keypad, touch screen, and/or stylus through which a user of log feed analysis and repair computing device 601 may provide input, and may also include one or more of a speaker for providing audio output and a video display device for providing textual, audiovisual and/or graphical output. Computing system environment 600 may also include optical scanners (not shown).

Log feed analysis and repair computing device 601 may operate in a networked environment supporting connections to one or more remote computing devices, such as computing devices 641 and 651. Computing devices 641 and 651 may be personal computing devices or servers that include any or all of the elements described above relative to log feed analysis and repair computing device 601.

The network connections depicted in FIG. 6 may include Local Area Network (LAN) 625 and Wide Area Network (WAN) 629, as well as other networks. When used in a LAN networking environment, log feed analysis and repair computing device 601 may be connected to LAN 625 through a network interface or adapter in communications module 609. When used in a WAN networking environment, log feed analysis and repair computing device 601 may include a modem in communications module 609 or other means for establishing communications over WAN 629, such as network 631 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one FIG. may be used in combination with one or more steps described with respect to another figure, and/or one or more depicted steps may be optional in accordance with aspects of the disclosure.

What is claimed is:

1. A system comprising:
   a data center comprising a plurality of data servers providing one or more computing services to a client computing device; and
   a repair analysis server connected to a plurality of cloud server systems, each of the plurality of cloud server systems being independently operated from one another and from the repair analysis server,
   wherein the repair analysis server comprises one or more processors and memory storing instructions that, when executed by the one or more processors, cause the repair analysis server to:
      receive log feeds from the data center through a smart grid network configured to provide electrical power and data communications;
      select a first cloud system of the plurality of cloud server systems to analyze the log feeds for potential errors;
      detect a condition of the first cloud system during the analysis of the log feeds;
      in response to detecting the condition of the first cloud system:
         select a second cloud system of the plurality of cloud server systems different from the first cloud system; and
         transfer a processing task associated with analyzing the log feeds from the first cloud system to the second cloud system;
      determine that the log feeds indicate one or more errors based on the analysis of the log feeds; and
      transmit a resolution for the one or more errors to the data center.

2. The system of claim 1, wherein the log feeds includes at least one log feed from each of the plurality of data servers at the data center.

3. The system of claim 1, wherein receiving the log feeds through the smart grid network includes receiving quantized particles representing the log feeds.

4. The system of claim 1, wherein the smart grid network includes an electrical circuit and a fiber optic network.

5. The system of claim 1, wherein the repair analysis server is further caused to:
   determine a resolution to the one or more errors including generating executable code configured to be executed by at least one data server of the plurality of data servers.

6. The system of claim 5, wherein the repair analysis server is configured to determine the resolution using machine-learning algorithms based on historical identified issues and corresponding resolutions stored in a knowledge base.

7. The system of claim 5, wherein the repair analysis server is further configured to determine the resolution by delegating a resolution identification task to a server in one of the plurality of cloud server systems.

8. The system of claim 1, wherein selecting the second cloud system of the plurality of cloud server systems different from the first cloud system based on at least one of: a processing load of the first cloud system, and a network latency between the first cloud system and the repair analysis server.

9. The system of claim 1, wherein transferring the processing task associated with analyzing the log feeds from the first cloud system to the second cloud system includes modifying a format of data corresponding to the processing task prior to transferring the processing task to the second cloud system.

10. A method for transmitting log feeds through a network, comprising:
   receiving, by a repair analysis server, log feeds from a data center through a smart grid network configured to provide electrical power and data communications, the data center including a plurality of data servers;
   selecting, by the repair analysis server, a first cloud system of a plurality of cloud server systems to analyze the log feeds for potential errors;
   detecting, by the repair analysis server, a condition of the first cloud system during the analysis of the log feeds;
   in response to detecting the condition of the first cloud system:
      select a second cloud system of the plurality of cloud server systems different from the first cloud system; and
      transfer a processing task associated with analyzing the log feeds from the first cloud system to the second cloud system;
   determining, by the repair analysis server, that the log feeds indicate one or more errors based on the analysis of the log feeds; and
   transmitting, by the repair analysis server, a resolution for the one or more errors to the data center.

11. The method of claim 10, further comprising:
   determining a resolution to the one or more errors including generating executable code configured to be executed by at least one data server of the plurality of data servers.

12. The method of claim 11, wherein the repair analysis server is configured to determine the resolution using machine-learning algorithms based on historical identified issues and corresponding resolutions stored in a knowledge base.

13. The method of claim 11, wherein the repair analysis server is further configured to determine the resolution by delegating a resolution identification task to a server in one of the plurality of cloud server systems.

14. The method of claim 10, wherein selecting the second cloud system of the plurality of cloud server systems different from the first cloud system based on at least one of: a processing load of the first cloud system, and a network latency between the first cloud system and the repair analysis server.

15. The method of claim 10, wherein transferring the processing task associated with analyzing the log feeds from the first cloud system to the second cloud system includes modifying a format of data corresponding to the processing task prior to transferring the processing task to the second cloud system.

16. A non-transitory computer-readable medium storing computer-readable instructions that, when executed, cause a repair analysis server to:
   receive log feeds from a data center through a smart grid network configured to provide electrical power and data communications, the data center comprising a plurality of data servers;
   select a first cloud system of a plurality of cloud server systems to analyze the log feeds for potential errors;
   detect a condition of the first cloud system during the analysis of the log feeds;

in response to detecting the condition of the first cloud system:
  select a second cloud system of the plurality of cloud server systems different from the first cloud system; and
  transfer a processing task associated with analyzing the log feeds from the first cloud system to the second cloud system;
determine that the log feeds indicate one or more errors based on the analysis of the log feeds; and
transmit a resolution for the one or more errors to the data center.

17. The non-transitory computer-readable medium of claim 16, wherein the repair analysis server is further caused to:
  determine a resolution to the one or more errors including generating executable code configured to be executed by at least one data server of the plurality of data servers.

18. The non-transitory computer-readable medium of claim 17, wherein the repair analysis server is further configured to determine the resolution by delegating a resolution identification task to a server in one of the plurality of cloud server systems.

19. The non-transitory computer-readable medium of claim 16, wherein selecting the second cloud system of the plurality of cloud server systems different from the first cloud system based on at least one of: a processing load of the first cloud system, and a network latency between the first cloud system and the repair analysis server.

20. The non-transitory computer-readable medium of claim 16, wherein transferring the processing task associated with analyzing the log feeds from the first cloud system to the second cloud system includes modifying a format of data corresponding to the processing task prior to transferring the processing task to the second cloud system.

* * * * *